July 26, 1960

A. E. JENSEN 2,946,515

POWER UNIT FOR MOVING PIPE LINES

Filed July 1, 1957

INVENTOR.
ARTHUR E. JENSEN
BY *Fulwider Mattingly & Huntley*
Attorneys

July 26, 1960
A. E. JENSEN
2,946,515
POWER UNIT FOR MOVING PIPE LINES
Filed July 1, 1957
2 Sheets-Sheet 2
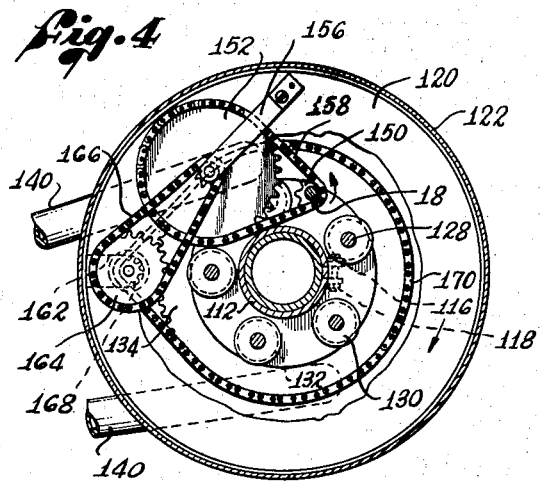
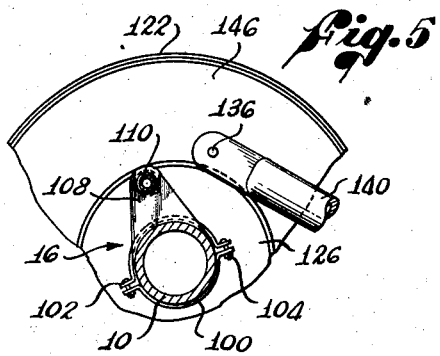
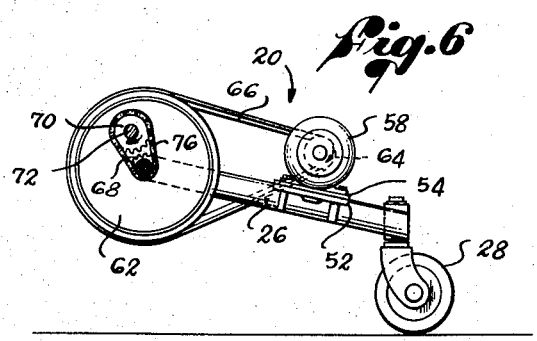
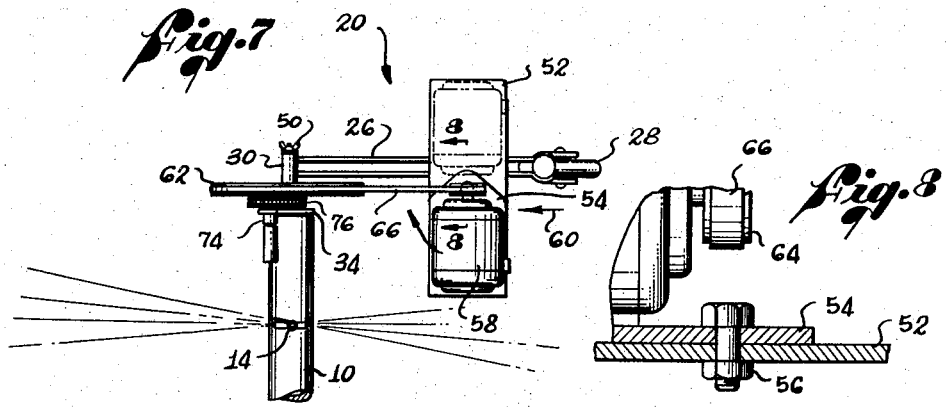
INVENTOR.
ARTHUR E. JENSEN
BY
Attorneys

United States Patent Office 2,946,515
Patented July 26, 1960

2,946,515

POWER UNIT FOR MOVING PIPE LINES

Arthur E. Jensen, 11372 SW. Skyline Drive,
Lemon Heights, Calif.

Filed July 1, 1957, Ser. No. 669,322

24 Claims. (Cl. 239—212)

The present invention relates generally to portable irrigation systems and in particular to a power transmission apparatus for moving a long length of irrigation pipe over a field.

A variety of devices have been heretofore proposed and utilized for moving a wheel-supported string of irrigation pipe across the ground. In such devices a single power unit is connected to the midpoint of the string to drive the wheels through the pipe itself. As the length of the string may exceed 12000 feet, the use of the single power unit almost invariably results in "wrapping" or twisting of the string on both sides of the power unit as a result of the torsional strain imposed by the power unit. Thus, after the string has been moved the desired distance, it is found that the sprinkler heads at one end of the pipe may be disposed in the correct upwardly extending position while sprinkler heads at the other end of the pipe may be pointed downwardly and thus will not distribute the water in the desired fashion. In other words, the twisting or wrapping of the string of pipe also results in a somewhat helical arrangement of the sprinkler heads.

Another disadvantage that arises from the use of a single power unit connected to the center of the string is the inordinate amount of time consumed in setting up the string in a new location. This results because the operator must actuate the power unit from the center of the string, while in order to connect the water to the string he must walk to one end or the other of the string. Aside from walking along the length of pipe for purposes of connecting it to the source of water, the operator must also proceed along the entire length of the pipe in order to line up all of the sprinkler heads in an upwardly extending direction after the string has come to rest in the new location.

My invention eliminates the aforementioned and other disadvantages of the previously available power units for moving pipe lines.

An object of my invention is to provide a portable irrigation apparatus that will move a long string of pipe across the area to be irrigated without any twisting or wrapping of the string so that all of the sprinkler heads of the string will move in unison and come to rest in the desired sprinkling position.

Another object of my invention is to provide a plurality of transmission units that are drivingly connected to a wheel supported string of irrigation pipe at spaced intervals therealong, all of the transmission units being synchronously driven from a single source of power. With this arrangement the entire irrigation apparatus is moved in unison across a field without any relative movement between adjacent parts thereof.

Yet another object of my invention is to provide power means for moving a string of irrigation pipe in either direction and in which the direction of movement can be reversed merely by a quickly accomplished, simple adjustment of one part of the apparatus. With this arrangement the irrigation system need never be disassembled.

A still further object of the invention is to provide a simplified apparatus for driving a plurality of transmission units from a single power unit.

The invention also has for an object the provision of a power apparatus for moving a string of pipe which is of very light, yet durable construction whereby a long service life is achieved.

These and other objects and advantages of my invention will be apparent from the following description of a presently preferred embodiment thereof when taken in conjunction with the annexed drawings in which:

Figure 4 is a vertical sectional view taken on the line 4—4 of Figure 3 showing the transmission train of the transmission unit shown in Figure 3;

Figure 5 is a partial sectional view taken on the line 5—5 of Figure 3 showing the manner of mounting a drive shaft along the string of pipe;

Figure 6 is a sectional view taken on the line 6—6 of Figure 3 and particularly showing the manner of mounting the power source for the plurality of transmission units;

Figure 7 is a top plan view of the portion of the apparatus shown in Figure 6; and Figure 8 is a fragmentary vertical sectional view, on an enlarged scale, taken on the line 8—8 of Figure 7.

Figure 1:
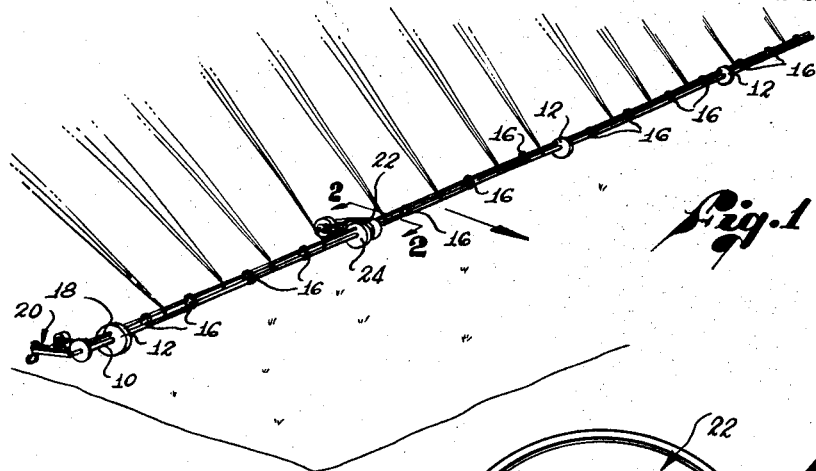
Figure 1 is a perspective view of a wheel supported string of irrigation pipe embodying powered moving means of my invention.

Referring now to the drawings for the general arrangement of the invention and in particular to Figure 1, there will be seen a string 10 of irrigation pipe which is made up of several individual lengths of such pipe coupled together by any convenient means. Concentrically affixed to the string 10 at regular intervals therealong is a plurality of wheels 12. A plurality of sprinkler heads 14 is regularly spaced in longitudinal alignment along the string 10.

A plurality of brackets 16 is clamped to the string 10 at regular intervals in order to provide bearing support for a drive shaft 18 that extends for the entire length of the string 10. It will be observed that the drive shaft 18 extends through the wheels 12 and is rotatably supported therein as well as in the brackets 16. At one end of the string 10 the drive shaft 18 is drivingly connected to a power unit 20 from which it receives torque.

In order to translate the torque of drive shaft 18 into rolling movement of the wheels 12, a plurality of transmission units 22 is concentrically mounted on the string 10 at regular intervals and drivingly coupled to the shaft 18. One such transmission unit 22 is shown in Figure 1; however, it is to be understood that for long strings of irrigation pipe two or more such units will be used. For example, in a string of about 1200 feet it is advisable to use between four and six transmission units.

As will be apparent from the following detailed description of the irrigation apparatus, rolling movement of the wheels 12 is caused by rotation of the string 10 while the rotating drive shaft 18 is carried in planetary movement around the string 10. The torque of the drive shaft 18 is transmitted to the wheels 12 through an epicyclic train, a portion of which is held against rotation by a torque arm assembly 24, which bears against a ground surface whereby the entire irrigation apparatus is reactively urged into movement across the ground.

The power unit 20 can be easily and quickly connected and disconnected to either end of the string of pipe 10. Thus, when it is desired to move the irrigation apparatus to another location the string 10 is disconnected from the source of water at one end thereof and the power unit 20 connected to that end. The apparatus is then moved the desired distance, say 40 or 60 feet, after which the power unit 20 is disconnected and the end of string 10 once again connected to the source of water.

Specifically, the power unit 20 includes an elongate rigid frame 26 (Figures 6 and 7) that has a pivotally mounted dolly wheel 28 at one end thereof. At its other end the frame 26 has a transversely extending sleeve 30 rigidly affixed thereto (see Figure 3), which provides a rotatable bearing for a tubular member 32.

The member 32 extends inwardly beyond an end of the sleeve 30 and has a transversely extending plate 34 rigidly affixed to its protruding end to cover one end of the string of pipe 10. A cylindrical member 36 is welded or otherwise fastened to the inner face of the plate 34 in axial alignment with the tubular member 32, and has an end wall 38 that is formed with a hole 40 in alignment with the tubular member 32.

An elongate rod 42 is axially slidably mounted in the tubular member 32 and extends inwardly therefrom through the hole 40 in the end wall 38 of the cylindrical member 36. The inner end of the rod 42 carries an enlarged head that has a conical surface 46 which confronts the end wall 38 of the cylindrical member 36. An annular rubber member 48 that is adhesively secured to the end wall 38 of cylindrical member 36 is formed with one end of complementary configuration to the conical surface 46.

The rubber member 48 in unstressed condition is of lesser diameter than the internal diameter of the pipe and string 10 so as to be receivable therein. The cylindrical member 36 is slidably receivable within one end of the string 10 so that when the rod 42 is axially withdrawn the rubber member 48 is deformed radially outwardly to frictionally engage the interior of the string 10 to hold the upper end of the power unit 20. Compression of the rubber member 48 for this purpose is accomplished by a wing nut 50 which threadedly engages the outer end of the rod 42. Thus, rotation of the wing nut 50 in the appropriate direction causes nut 50 to bear against the outer end of tubular member 32 in order to compress rubber member 48 as aforesaid.

Between its ends the power unit frame 26 rigidly mounts a transversely extending platform 52, to which a motor base 54 is pivotally connected by means of a fastener 56 (see Figure 8). A motor 58 is mounted on the base 54 that can be pivoted through an arc of 180 degrees in the manner indicated by the arrow in Figure 7. When the motor 58 is in the position shown in full line in Figure 7 it is adapted to drive the irrigation apparatus in the direction indicated by the arrow 60. As will later be apparent, when the motor 58 is moved through an arc of 180 degrees into the position shown in phantom outline in Figure 7, the irrigation apparatus will be caused to move in the opposite direction from that shown by the arrow 60.

Figure 3:
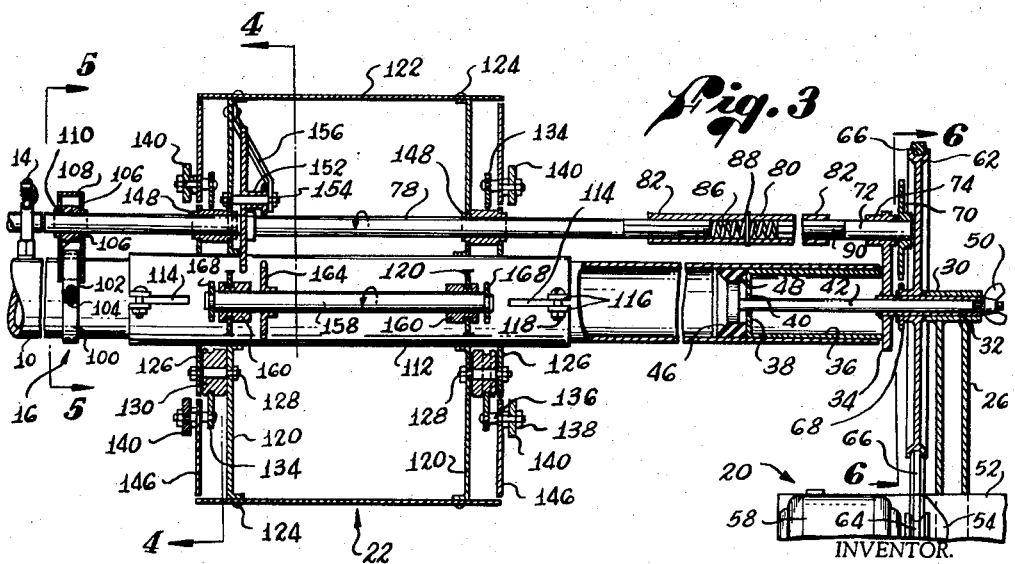
Figure 3 is a vertical sectional view, on an enlarged scale, taken along the longitudinal axis of the apparatus of Figure 1 and showing the connection of the power unit to one end of the string and interior details of a transmission unit drivingly connected to the power unit.

Referring now to Figure 3, it will be seen that a large diameter pulley 62 is rotatably mounted on the tubular member 32 between plate 34 and the inner end of the member 32 in alignment with the drive pulley 64 of the motor 58. The pulleys 62 and 64 are drivingly connected by an endless V-belt 66. A small diameter sprocket 68 is formed integrally with the large pulley 62 and is disposed in alignment with a sprocket wheel 70 that is affixed to a shaft 72 which is rotatably mounted in a bearing 74 formed in an offset portion of the plate 34. An endless chain 76 interconnects the sprockets 68 and 70. As will presently appear, the shaft 72 is drivingly connected to the drive shaft 18 whereby power from the motor 58 can be transmitted to the several transmission units 22.

In order to transmit torque to the several transmission units 22, the drive shaft 18 extends for substantially the entire length of the pipe string 10. Accordingly, drive shaft 18 is preferably made up of several lengths of tube 78 which are interconnected by means of a coupler 80, such as is best seen in Figure 3.

Each tube 78 is formed with opposite end portions 82, of hexagonal or other polygonal cross-sectional configuration, which are axially slidably receivable in complementarily shaped opposite end portions of coupler 80. The tubes 78 are thus rotatively coupled and can be quickly and easily assembled into the elongate drive shaft 18. Allowance is made for longitudinal expansion and contraction of the tubes 78 by means of a compression spring 86 housed in coupler 80 between ends of tubes 78. A diametrically extending pin 88 in coupler 80 holds spring 86 in place when coupler 80 is disengaged from tubes 78.

In order to couple the drive shaft 18 to the prime mover of power unit 20, the shaft 74 at the upper end of power unit 20 has a hex head 90 engageable with one end of a coupler 80. This connection affords longitudinal confinement of drive shaft 18 at one end thereof and a suitable abutment (not shown) is provided at the other end of drive shaft 18 to confine it at that end.

As can be seen from Figure 1, the brackets 16 support the long drive shaft 18 on the string of pipe 10 at spaced intervals therealong. The brackets 16 are rigidly clamped to the pipe 10 in order to rotate in unison therewith while at the same time providing a bearing support for the drive shaft 18.

As is shown in Figure 5, the bracket 16 includes a pair of semicylindrical straps 100, each of which has outwardly flanged ears 102 at opposite ends thereof. The straps 100 are placed around the pipe 10 and clamped in place by means of fasteners 104 that extend through aligned holes formed in the ears 102. As can be seen in Figure 3, the straps 100 are of such width as to be receivable between a pair of side plates 106 of a saddle member 108. The side plates 106 are interconnected by a web portion of the saddle 108 that is adapted to be seated on the pipe 10, under one of the straps 100. Thus, when the fasteners 104 are tightened, the saddle 108 is securely held between a strap 100 and the pipe 10. The outer ends of the side plates 106 of saddle 108 are interconnected by a bushing 110 which is preferably made of Micarta, nylon, or the like, and which rotatably receives the drive shaft 18.

As is indicated generally in Figure 1, the drive shaft 18 is also rotatably supported in the wheels 12. Although not shown in detail, it will be understood that this support can be of any conventional construction and preferably takes the form of bushings similar to the bushings 110 used in the brackets 16.

It is apparent from Figures 3 and 6 that a considerable reduction in angular velocity takes place between the motor 58 and the drive shaft 18 by means of the size relationships between the pulleys 62, 64, and the sprockets 68, 70. A further reduction occurs in the transmission units 22. As is obvious, the drive shaft 18 turns at the same speed throughout its length and as the reduction in each of the transmission units 22 is identical, all of the wheels 12 supporting the string of pipe 10 will turn at exactly the same angular velocity whereby any tendency to twist sections of the string of pipe 10 is eliminated.

Each transmission unit 22 is fastened to the pipe 10 at any point along its length. An elongated sleeve 112 is slipped over an end of one of the sections making up the string of pipe 10. A pair of longitudinally extending aligned slots 114 are formed in opposite ends of the sleeve 112. A pair of tabs 116 are mounted on opposite sides of each slot 114, as by welding to the sleeve 112, and each pair of the tabs 116 is provided with aligned holes adapted to receive a fastener 118, such as a nut and bolt, which can be turned to tightly clamp the sleeve 112 in place on the pipe 10.

A pair of annular wall members 120 are concentrically affixed to the sleeve 112 at opposite ends thereof. As is indicated in Figure 3, the members 120 are preferably made of sheet material and are provided with inwardly turned flanges at both the inner and outer peripheries thereof. Thus, the members 120 can be fastened to the sleeve 112 by welding or other suitable means. Securely fastened to the outer periphery of the members 120 is a cylindrical housing 122 which is preferably affixed to the members 120 by rivets 124 which extend into the outer flanges of the members 120. It will be noted that the housing 122 is longer than the spacing between the walls 120 so as to overhang said walls at either end.

Another pair of annular members 126 is also concentrically rigidly affixed at opposite ends of the sleeve 112 and spaced outwardly from the walls 120. It should be noted that the outer diameter of the members 126 is substantially less than the outer diameter of the walls 120. The reason for this construction will presently become apparent.

A plurality of equally circularly spaced spacer bolts 128 extend between each member 126 and the wall 120 adjacent thereto. As can be seen by reference to Figure 4, the spacer bolts 128 are equally circularly spaced around the longitudinal axis of the string of pipe 10, and each bolt rotatably supports a roller 130, each of which is provided with a circumferentially extending groove 132.

Figure 2:
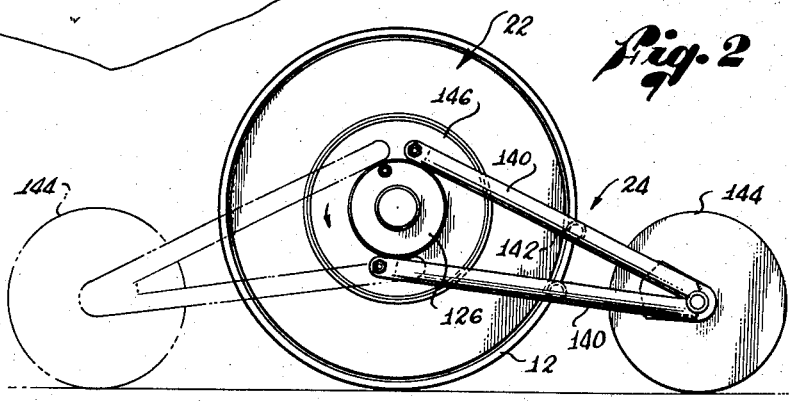
Figure 2 is a vertical sectional view, on an enlarged scale, taken on the line 2—2 of Figure 1 indicating the path through which certain parts of the apparatus move when its direction is reversed.

Each set of rollers 130 rotatably supports an annular sprocket 134 in the roller grooves 132. A pair of fasteners 136 is affixed to each sprocket 134 at diametrically opposite points thereon and by means of lock nuts 138 or the like serve to connect one end of a pair of torque arms 140 to each annular sprocket 134. As is indicated in Figures 1 and 2, the two pairs of torque arms 140 of each transmission unit 22 are interconnected by suitable braces 142. The torque arm frame thus formed supports a ground engaging wheel 144 at the outer ends of the torque arms.

Referring now to Figure 3, it will be seen that bolts 136 support an annular dust shield 146 which is disposed between the annular sprocket 134 and the torque arm 140. It will be observed that the inner diameter of the dust shield 146 is slightly larger than the outer diameter of the annular member 126 while the outer diameter of the dust shield 146 is slightly less than the internal diameter of the housing 122 to provide suitable clearance. The dust shield 146 thus serves to prevent the entrance of blowing dust and other similar foreign material into the transmission unit 22.

As is apparent, the torque arm assembly 24, by virtue of its ground engaging wheel 144, prevents rotation of the annular sprocket 134. As will later be apparent, in the operation of the apparatus the annular sprocket 134 does not undergo any rotation whatsoever except during reversal of direction of the string of pipe 10. Thus, when the string of pipe 10 is being moved across a field, as shown in Figure 1, the annular sprocket 134 remains rotationally immobile while the other elements of the transmission unit 22 presently to be described undergo planetary movement around the annular sprocket 134.

As is shown in the upper half of Figure 3, a bushing 148 is mounted between each annular member 126 and its adjacent wall 120. The pair of bushings 148 are in alignment in order to rotatably support the drive shaft 18 which extends through each transmission unit 22 in this manner.

Adjacent the inner face of one of the walls 120 the drive shaft 18 has rigidly affixed thereon a small sprocket 150. A compound sprocket 152 is rotatably mounted on a spacer bolt 154 that extends inwardly from the same wall 120. The inner end of the spacer bolt 154 is securely held in place by one end of an arm 156 whose other end is securely fastened to the adjacent wall 120. The larger diameter portion of the compound sprocket 152 is in alignment with the small sprocket 150 and the two sprockets are drivingly interconnected by means of an endless chain 158.

In order to transmit the torque of the drive shaft 18 to the annular sprockets 134 at both ends of the transmission unit 22, the transmission unit 22 is provided with a jack shaft 158 such as is best seen in Figure 3. At its opposite ends the jack shaft 158 is supported in a pair of bearings 160, each of which is provided with a circumferentially extending groove adapted to slidably embrace the edges of a slot 162 which opens into an edge of each of the wall members 120.

The slot 162 can best be seen in Figure 4 and, as is apparent, the two slots 162 of the walls 120 are in alignment with one another to support the jack shaft 158 in longitudinal alignment with the sleeve 112.

Rigidly affixed by a key (not shown) or other suitable means to the jack shaft 158 is a sprocket 164, which is disposed in alignment with the small diameter portion of the compound sprocket 152. The angular velocity of the transmission unit is reduced in passing from the drive shaft 18 to the compound sprocket 152 and is further reduced in passing by means of an endless roller chain 166 from the compound sprocket 152 to the jack shaft sprocket 164.

A small diameter planetary sprocket 168 is rigidly affixed to each end of the jack shaft 158. Each of the planetary sprockets 168 is disposed in alignment with one of the annular sprockets 134 and drivingly connected thereto by an endless chain 170.

The operation of the apparatus is as follows. When it is desired to move the wheel supported string of pipe 10 from one position to another, the power unit 20 is connected to one end thereof in the manner previously described, the water source being first disconnected from that end.

Assuming that the string of pipe 10 is to be moved in the direction of the arrow shown in Figure 1, the motor 58 is adjusted on the power unit platform 52 to rotate its drive pulley 64 in a clockwise direction, as viewed in Figure 6. The drive shaft 18 is thus caused to rotate in the direction indicated by the arrows in Figure 3 and in a counterclockwise direction in Figure 4. As is shown in Figure 4, the annular sprockets 134 will accordingly be urged into the same direction of rotation, but by virtue of the torque arm assembly 24 will be held against such rotation. As a reaction to the rotational immobility of annular sprocket 134, the drive shaft 18, and the transmission elements intermediate the drive shaft and the annular sprockets 134 will be urged into planetary movement around the annular sprockets 134, i.e., in a clockwise direction as indicated in Figure 4. Therefore, the wheels 12 will accordingly be urged or forced into the same direction of rotation to advance the string of pipe 10 in the direction of the arrow in Figure 1. Inasmuch as the drive shaft 18 turns at the same rate of speed throughout its length, and since the transmission units 22 achieve exactly the same reduction, all of the wheels 12 and all portions of the string of pipe 10 will turn at exactly the same speed so that no twisting of the string of pipe 10 can take place.

When the string of pipe 10 has been moved the desired distance, the motor 58 is de-energized, preferably at the instant when all of sprinkler heads 14 are in a vertical position, extending upwardly. The power unit 20 is then disengaged and the end of the string of pipe 10 reconnected to a source of water.

When it is desired to reverse the direction of movement of the string of pipe 10, it is necessary only to remove the belt 66 from the drive pulley 64 and pivot the motor 58 from the direction shown in full line in Figure 7 to the position shown in phantom line. Belt 66 is then re-engaged with drive pulley 64. This will result in a reversal of the direction of rotation of the drive shaft 18 when the prime mover is energized.

In reversing direction, the torque arm assembly 24 must first be reversed from the position shown in full line in Figure 2 to the position shown in dotted outline. This is accomplished merely by energizing the motor 58 in its new position. Thus, when motor 58 is initially energized, the drive shaft 18 and all portions of the transmission between the drive shaft and the annular sprockets 134 will remain relatively stationary while the annular sprockets will be forced into clockwise rotation, as viewed in Figure 4. This will carry the torque arm assembly 24 through an arc of approximately 180 degrees until it comes to rest on the other side of the string of pipe 10 from the position shown in Figure 1. When the torque arm assembly wheel 144 comes into contact with the ground, the annular sprockets 134 then become rotationally immobile and, as a reaction to this immobility, the transmission elements are once again urged into planetary movement around the annular sprockets 134. This will cause movement of the string of pipe 10 in a direction opposite to that indicated by the arrow in Figure 1.

Various modifications and changes may be made with respect to the foregoing description without departing from the spirit of the invention or the scope of the following claims.

I claim:

1. Apparatus for moving a string of pipe that has a plurality of wheels rigidly concentrically mounted thereon, comprising: a transmission means connected to said string including a rotatably supported annular element concentrically mounted around said string and including a drive element rotatably mounted in said means in a position offset from the axis of said string and drivingly engaged with said annular element whereby when said annular element is held against rotation and said drive element is rotated, said rotating drive element is revolved about the axis of said string to exert a moment of force on said string to rotate said string and wheels; and means connected to said annular element to hold said element against rotation with said string.

2. Apparatus for moving a string of pipe that has a plurality of wheels rigidly concentrically mounted thereon, comprising: supporting means rigidly affixed to said string; an epicyclic train mounted on said supporting means that includes an annular element concentrically disposed around said string, said element and said string being relatively angularly movable; means connected to said annular element to hold it against rotation with said string; and a drive member in said train to turn said supporting means, string, and pipe in reaction to the rotational immobility of said annular element.

3. Apparatus for moving a string of pipe that has a plurality of wheels rigidly concentrically mounted thereon, comprising: supporting means rigidly mounted on said string for rotation with said string; a drive member rotatably mounted on said supporting means with its axis of rotation off-set from the axis of said string; a rotatable annular member mounted on and around said string with its central axis coincident with the axis of said string drivingly connected to said drive member; means connected to and biasing said annular member against rotation with said string; and means drivingly connected to said drive member for turning said drive member.

4. Apparatus for moving a string of pipe that has a plurality of wheels rigidly concentrically mounted thereon, comprising: supporting means fastened to said string; a driving member mounted on said supporting means for planetary revolution around the axis of said string; an annular member rotatably mounted on said supporting means with its axis of rotation coincident with the axis of said string; means drivingly interconnecting said driving member to said annular member and adapted to cause relative movement of said members in response to actuation of said driving member; means on said annular member to hold said annular member against rotation; and means for actuating said driving member.

5. In an apparatus for moving a string of pipe that has a plurality of wheels rigidly concentrically mounted thereon, the combination comprising: a plurality of transmission supports affixed to said string at spaced intervals therealong; an epicyclic train of mechanism mounted on each support that includes a central rotatable annular element concentrically disposed around said string that is drivingly engaged with a drive member of said mechanism that is constrained by said support for bodily movement around the axis of said string to exert a moment of force on said string through the medium of said support; means holding each of said annular elements against rotation with said string; and means for driving all of said members.

6. In an apparatus for moving a string of pipe that has a plurality of wheels rigidly concentrically mounted thereon, the combination comprising: a plurality of transmission supports affixed to said string at spaced intervals therealong; a drive member rotatably mounted on each of said supports that is constrained for bodily movement around the axis of said string to exert a moment of force on said string through the medium of said support; an annular member rotatably carried by each of said supports with its axis of rotation coincident with the axis of said string; positive drive means interconnecting said drive member and annular member; means biasing each of said annular members against rotation with said string; and means interconnected between said drive members and adapted for rotating all of said drive members in unison.

7. Apparatus for moving a string of pipe that has a plurality of wheels rigidly concentrically mounted thereon, comprising: a plurality of transmission supports affixed to said string at spaced intervals therealong; a drive member rotatably mounted on each of said supports for planetary revolution around the axis of said string; an annular member rotatably carried by each of said supports with its axis of rotation coincident with the axis of said string; means drivingly connecting each of said drive members to said annular members; means holding each of said annular elements against rotation with said string; an elongate drive shaft rotatably mounted on and along said string for planetary revolution about the axis of said string that is drivingly engaged with all of said drive members; and power means mounted at one end of said string adapted for turning said shaft.

8. Apparatus for moving a string of pipe that has a plurality of wheels rigidly concentrically mounted thereon, comprising: a plurality of transmission supports at spaced intervals along said string each of which includes an elongate sleeve clamped to said string; a drive member rotatably mounted on each of said supports with its axis of rotation off-set from the axis of said string; a pair of annular members rotatably mounted on each of said supports around said sleeve at opposite ends thereof; positive drive means on said supports drivingly interconnecting said drive members to said pair of annular members; ground engaging means holding each pair of annular members against rotation with said string; and means drivingly engaged with all of said drive members for rotating all of said drive members at the same rate whereby said rotating drive members are urged into planetary revolution around the axis of said string in response to the rotational immobility of said annular members and said supports, string, and wheels are caused to rotate in unison.

9. Apparatus for moving a string of pipe that has a plurality of wheels rigidly concentrically mounted thereon, comprising: a plurality of transmission supports affixed to said string at spaced intervals therealong; an epicyclic train of mechanism mounted on each support that includes a rotatable annular element concentrically disposed around said string in a constant velocity ratio with a rotatable drive member included in said mechanism, said drive member being constrained by said mechanism for bodily planetary revolution about said string when said annular element is held against rotation to cause rotation of said support, string, and wheels; means on each of said annular elements to hold them against rotation with said string; an elongate drive shaft rotatably mounted on and along said string for planetary revolution about the axis of said string that positively drives all of said drive members; and means connected to one end of said shaft for rotating said shaft.

10. Apparatus for moving a string of pipe that has a plurality of wheels rigidly concentrically mounted thereon, comprising: a transmission support affixed to said string; an epicyclic train of mechanism mounted on said support that includes a rotatable annular element concentrically disposed around said string drivingly connected to a rotatable drive member included in said mechanism, said drive member being constrained by said mechanism for bodily planetary revolution about said string when said annular element is held against rotation to cause rotation of said support, string, and wheels, arm means affixed to said annular element and extending outwardly therefrom into ground engaging contact at its free end to hold said annular element against rotation; and means operatively associated with said drive member for rotating said drive member to urge it into said planetary revolution.

11. Apparatus for moving a string of pipe that has a plurality of wheels rigidly concentrically mounted thereon, comprising: a plurality of transmission supports affixed to said string at spaced intervals therealong; a rotatable drive member mounted on each of said supports with its axis of rotation off-set from the axis of said string; an annular member rotatably carried by each of said supports with its axis of rotation coincident with the axis of said string; positive drive means on each of said supports drivingly interconnecting said drive member and annular member; torque arm means on each of said annular members having a ground-engageable free end for biasing said annular member against rotation during rotation of said drive member in a first direction whereby said drive member is reactively impelled into planetary movement around said string to rotate said support, string, and wheels, rotation of said drive member in the opposite direction initially causing said annular member and torque arm means to rotate while said string, wheels, and support remain stationary; and means drivingly interconnecting said drive members for selectively turning all of said drive members in unison in a clockwise or counter-clockwise direction to reverse the direction of movement of said string.

12. Apparatus for moving a string of pipe that has a plurality of wheels rigidly concentrically mounted thereon, comprising: a plurality of transmission supports affixed to said string at spaced intervals therealong; a drive member rotatably mounted on each of said supports for bodily planetary revolution, while rotating, around the axis of said string; an annular member rotatably carried by each of said supports with its axis of rotation coincident with the axis of said string; means on each of said supports adapted for drivingly connecting each of said drive members to said annular member in a constant velocity ratio; torque arm means affixed to each of said annular members and extending outwardly therefrom into ground engaging contact at its free end to hold each of said annular members against rotation during rotation of said wheels, string, and supports; an elongate drive shaft rotatably mounted on and along said string for planetary revolution, while rotating, about the axis of said string that positively drivingly engages all of said drive members; and a means connected to one end of said shaft that is adapted to selectively turn said drive shaft in either direction.

13. Apparatus for moving a string of pipe that has a plurality of wheels rigidly concentrically mounted thereon, comprising: a transmission support affixed to said string; an epicyclic train of mechanism mounted on said support that includes a rotatable annular element concentrically disposed around said string drivingly connected to a rotatable drive member included in said mechanism, said drive member being constrained by said mechanism for bodily planetary revolution about said string when said annular element is held against rotation to cause rotation of said support, string, and wheels; torque arm means affixed to said annular element and extending outwardly therefrom into ground engaging contact at its free end to unidirectionally hold said annular element against rotation; an elongate drive shaft rotatably mounted on and along said string for planetary revolution about the axis of said string that is drivingly connected to the drive member of said mechanism; a wheel supported frame connected to one end of said string; a prime mover carried by said frame; and means to drivingly connect said prime mover to said drive shaft for selective rotation of said shaft in either direction.

14. Apparatus for moving a string of pipe that has a plurality of wheels rigidly concentrically mounted thereon, comprising: a plurality of transmission supports affixed to said string at spaced intervals therealong; a rotatable drive member mounted on each of said supports for planetary revolution around the axis of said string; an annular member rotatably carried by each of said supports with its axis of rotation coincident with the axis of said string; means on said supports for drivingly connecting each of said drive members to one of said annular members in a constant velocity ratio; torque arm means affixed to each of said annular members and extending outwardly therefrom into ground engaging contact at its free end to unidirectionally hold each of said annular members against rotation; an elongate drive shaft rotatably mounted on and along said string for planetary revolution about the axis of said string and that is drivingly connected to said drive members; a wheel supported frame connected to one end of said string; a prime mover carried by said frame; and means to drivingly connect said prime mover to said drive shaft for selective rotation of said shaft in either direction.

15. Apparatus for moving a string of pipe, comprising: a transmission support affixed to said string; a drive member rotatably mounted on said support for planetary revolution around the axis of said string; an annular member rotatably mounted on said support and around said string; means on said support drivingly interconnecting said drive member to said annular member; means connected to said annular member for holding said annular member against rotation with said string; means on said string adapted for rotating said drive member whereby said string and support are rotated and said rotating drive member is bodily planetarily revolved as a reaction to the rotational immobility of said annular member; and wheel means supporting said string and drivingly connected thereto.

16. Apparatus for moving a string of pipe, comprising: a transmission support including a sleeve rigidly mounted on said string; a rotatable drive member mounted on said support with its axis of rotation off-set from the axis of said string; a pair of annular members rotatably mounted on said support and concentrically around said string at opposite ends of said sleeve; drive means on said support drivingly interconnecting said drive member to said annular members; ground-engaging means connected to said annular members to bias them against rotation upon rotation of said drive member whereby said rotating member is urged into planetary revolution and said string is rotated in reaction to the rotational immobility of said annular members; means on said string for rotating said drive member; and wheel means concentrically mounted on said string and having a positive driving connection therewith.

17. Apparatus for moving a string of pipe, comprising: a sleeve clamped around said string; a pair of annular walls concentrically, rigidly affixed to said sleeve at opposite ends thereof; a drive shaft rotatably supported between said walls in alignment with said string; a pair of annular members each of which is rotatably supported by one of said walls in concentric relationship with said string; chain and sprocket means supported by said walls and drivingly connecting said drive shaft to both of said annular members; a torque arm frame rigidly connected at one end thereof to both of said annular members and extending generally radially outwardly from said annular members, the outer end of said frame having a ground engaging wheel; means on said string for rotating said drive shaft; and wheel means concentrically rigidly mounted on said string.

18. A transmission apparatus comprising: an epicyclic train of mechanism that includes an annular member and a rotatable drive member constrained by said mechanism for planetary revolution, while rotating, around the axis of said annular member, and means drivingly interconnecting said two members; a rotatably supported driven member mounted coaxially with said annular member; a support means for said mechanism rigidly affixed to said driven member that rotatably supports said annular member for angular movement relative to said driven member and rotatably supports said drive member for said constrained planetary revolution thereof whereby when said annular member is held against rotation and said drive member is rotated, said rotating drive member is urged into said revolution to cause rotation of said driven shaft through the medium of said support means; and a means having a fixed support external of said transmission apparatus and operatively associated with said annular member that is adapted to hold said annular member against rotation with said driven member.

19. In a vehicular apparatus, the combination comprising: an epicyclic train of mechanism that includes an annular member and a rotatable drive member constrained by said mechanism for planetary revolution, while rotating, around the axis of said annular member, and including means drivingly interconnecting said two members; a rotatably supported driven member mounted coaxially with said annular member; a plurality of ground engaging wheels; means drivingly interconnecting said driven member and said wheels; a support means associated with said mechanism rigidly affixed to said driven member for rotation in unison with said driven member and adapted to rotatably support said annular member for angular movement relative to said driven member and adapted to rotatably support said drive member for said planetary revolution thereof whereby when said drive member is rotated, said rotating drive member is urged into said revolution to cause rotation of said driven shaft through the medium of said support means; and a torque arm means rigidly affixed at one end to said annular member to extend generally radially from said annular member for contact with a ground surface at a free end thereof to hold said annular member against rotation with said driven member.

20. Apparatus for moving a string of pipe having a plurality of supporting wheels concentrically rigidly affixed to said pipe at spaced intervals therealong and adapted to be rolled in unison over a ground surface in response to rotation of said pipe, comprising: an annular element concentrically mounted around said pipe; support means interconnecting said pipe and said annular element for relative angular movement whereby said element can be held against rotation during rotation of said wheels and pipe during travel of said apparatus across a ground surface; a torque arm affixed at one end to said annular element and extending generally radially outwardly of said pipe for engaging a ground surface at its other end to hold said element against rotation with said pipe during travel of said apparatus; a drive shaft rotatably mounted on said support means and having an axis of rotation offset from the axis of said pipe; and means drivingly interconnecting said drive shaft and said annular element whereby rotation of said drive shaft urges said rotating shaft into planetary movement around the axis of said pipe as a reaction to rotational immobility of said annular element and torque arm, said planetary movement of said drive shaft applying torque to said pipe through said support means to turn said pipe and said wheels to cause said apparatus to travel across said ground surface.

21. Irrigating apparatus comprising: a string of pipe having a plurality of wheels concentrically rigidly affixed to said pipe at spaced intervals therealong to support said pipe and to be rolled in unison over a ground surface in response to rotation of said pipe; an annular element concentrically mounted around said pipe; support means affixed to said pipe and interconnecting said pipe and said annular element for relative angular movement whereby said element can be held against rotation during rotation of said wheels and pipe during travel of said apparatus across a ground surface; a torque arm affixed at one end to said annular element and extending generally radially outwardly of said pipe for engaging a ground surface at its other end to hold said element against rotation with said pipe during travel of said apparatus; a drive shaft rotatably mounted on said support means and having an axis of rotation offset from the axis of said pipe; and means drivingly interconnecting said drive shaft and said annular element whereby rotation of said shaft urges said rotating shaft into planetary movement about the axis of said pipe as a reaction to rotational immobility of said annular element and torque arm, said planetary movement of said drive shaft applying torque to said pipe through said support means to turn said pipe and said wheels to cause said apparatus to travel across said ground surface.

22. Irrigation apparatus as set forth in claim 21 including means for supplying torque to said drive shaft comprising: a plurality of brackets rigidly affixed to said pipe at spaced intervals therealong for rotation with said pipe; an elongated drive shaft rotatably mounted in said brackets extending from one end of said string of pipe to and drivingly engaged with said first drive shaft; a wheel supported frame connected to and adapted to rotatably receive said one end of said string of pipe; a prime mover mounted on said wheel-supported frame; and means to drivingly connect said prime mover to said second drive shaft for selective rotation of said shaft in either direction.

23. Apparatus for moving a string of pipe that has a plurality of wheels rigidly concentrically mounted thereon comprising: an annular element coaxially rotatably mounted on said string; a means connected to said element and adapted to hold said element against rotation with said string; a drive means; a support means for said drive means that is drivingly connected to said string and on which said drive means is supported for bodily planetary revolution of said drive means around the axis of said element; said element and said drive means being adapted to translate actuation of said drive means into relative movement of said element and drive means to cause movement of said string in response to rotational immobility of said element.

24. Apparatus for moving a string of pipe that has a plurality of wheels rigidly concentrically mounted thereon comprising: a member rigidly affixed to said string; an annular element coaxially rotatably mounted on said string; a drive means on said member that is operatively associated with both said member and said element and adapted to cause relative movement of said element and said member in response to actuation of said drive means; and a means on said element adapted to hold said element against rotation when said drive means is actuated to cause said member and said string to be moved in response to actuation of said drive means.

References Cited in the file of this patent

UNITED STATES PATENTS

| | | |
|---|---|---|
| 959,914 | Bevill | May 31, 1910 |
| 2,037,054 | Whaley | Apr. 14, 1936 |
| 2,665,941 | Idler | Jan. 12, 1954 |
| 2,796,292 | Maggart | June 18, 1957 |